United States Patent
Mukherjee

(10) Patent No.: US 8,989,667 B2
(45) Date of Patent: Mar. 24, 2015

(54) APPARATUS AND METHODS FOR A BANDWIDTH EFFICIENT SCHEDULER

(76) Inventor: Debanjan Mukherjee, Cupertino, CA (US)

( * ) Notice: Subject to any disclaimer, the term of this patent is extended or adjusted under 35 U.S.C. 154(b) by 190 days.

(21) Appl. No.: 13/432,719

(22) Filed: Mar. 28, 2012

(65) Prior Publication Data

US 2013/0260686 A1  Oct. 3, 2013

(51) Int. Cl.
*H04B 7/00* (2006.01)
*G06F 9/50* (2006.01)

(52) U.S. Cl.
CPC .................................. *G06F 9/5027* (2013.01)
USPC ........................................ 455/41.2; 455/41.3

(58) Field of Classification Search
CPC ............................. H04W 84/18; H04M 1/7253
USPC .............................................. 455/41.2, 41.3
See application file for complete search history.

(56) References Cited

U.S. PATENT DOCUMENTS

| | | | |
|---|---|---|---|
| 6,570,857 B1 * | 5/2003 | Haartsen et al. | 370/312 |
| 6,614,350 B1 * | 9/2003 | Lunsford et al. | 340/572.1 |
| 7,483,677 B2 * | 1/2009 | Zechlin et al. | 455/73 |
| 7,546,404 B2 * | 6/2009 | Yeh et al. | 710/117 |
| 7,647,038 B2 * | 1/2010 | Steelberg et al. | 455/414.2 |
| 7,693,485 B2 * | 4/2010 | Parys | 455/41.2 |
| 8,090,826 B2 * | 1/2012 | Tran et al. | 709/225 |
| 8,135,346 B2 * | 3/2012 | Zhodzishsky et al. | 455/41.2 |
| 8,213,864 B1 * | 7/2012 | Zhodzishsky et al. | 455/41.2 |
| 8,223,636 B2 * | 7/2012 | Kourkouzelis et al. | 370/229 |
| 8,315,234 B2 * | 11/2012 | Sohrabi | 370/338 |
| 8,422,372 B2 * | 4/2013 | Kim et al. | 370/235 |
| 8,424,046 B2 * | 4/2013 | Lin | 725/91 |
| 8,462,695 B2 * | 6/2013 | Oyman et al. | 370/328 |
| 8,606,319 B2 * | 12/2013 | Ali et al. | 455/558 |
| 8,626,067 B2 * | 1/2014 | Ko et al. | 455/41.2 |
| 8,781,519 B2 * | 7/2014 | Burchill et al. | 455/522 |
| 8,804,690 B1 * | 8/2014 | Wheeler et al. | 370/348 |
| 8,818,280 B2 * | 8/2014 | Ko et al. | 455/41.2 |
| 8,819,757 B2 * | 8/2014 | Rivera | 725/131 |
| 2002/0028657 A1 * | 3/2002 | Davies | 455/41 |

(Continued)

FOREIGN PATENT DOCUMENTS

| | | |
|---|---|---|
| TW | 200931867 | 7/2009 |
| TW | 201208442 | 2/2012 |

OTHER PUBLICATIONS

PCT Application No. PCT/US2013/033895—International Search Report and Written Opinion dated Nov. 7, 2013.

(Continued)

*Primary Examiner* — Hai V Nguyen
(74) *Attorney, Agent, or Firm* — Womble Carlyle Sandridge & Rice, LLP

(57) ABSTRACT

Methods and apparatus for scheduling shared time resources. In one embodiment, Bluetooth and IEEE 802.11 interfaces with overlapping frequency ranges are managed by an intelligent scheduler entity or process that schedules time slots for human interaction devices based on predictions on which Bluetooth device is active. By reducing the number of time slots reserved for inactive Bluetooth devices, the scheduler can free up time slots for IEEE 802.11 systems without significant perceptible impact on the Bluetooth devices. The freed time slots can increase in IEEE 802.11 performance by providing additional bandwidth (which can be perceptible by the user), thereby increasing user satisfaction and experience.

20 Claims, 5 Drawing Sheets

(56) References Cited

U.S. PATENT DOCUMENTS

| | | | |
|---|---|---|---|
| 2002/0136268 A1* | 9/2002 | Gan et al. | 375/133 |
| 2004/0044724 A1* | 3/2004 | Bell et al. | 709/203 |
| 2004/0242159 A1* | 12/2004 | Calderon et al. | 455/63.3 |
| 2005/0122990 A1* | 6/2005 | Parys | 370/449 |
| 2006/0089119 A1* | 4/2006 | Lipasti et al. | 455/410 |
| 2008/0207253 A1* | 8/2008 | Jaakkola et al. | 455/550.1 |
| 2008/0247367 A1* | 10/2008 | Guo et al. | 370/338 |
| 2009/0081962 A1 | 3/2009 | Sohrabi | |
| 2009/0086704 A1 | 4/2009 | Ho | |
| 2011/0097998 A1* | 4/2011 | Ko et al. | 455/41.2 |
| 2011/0208822 A1* | 8/2011 | Rathod | 709/206 |
| 2012/0020306 A1 | 1/2012 | Hole et al. | |
| 2013/0051330 A1* | 2/2013 | Le et al. | 370/329 |
| 2013/0203465 A1* | 8/2013 | Ali et al. | 455/558 |
| 2014/0099896 A1* | 4/2014 | Ko et al. | 455/41.2 |

OTHER PUBLICATIONS

Taiwanese Patent Application No. 102111250—Office Action dated Dec. 8, 2014.

* cited by examiner

APPARATUS AND METHODS FOR A BANDWIDTH EFFICIENT SCHEDULER

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of communication protocols and data networks. More particularly, in one exemplary aspect, the present invention is directed to, inter alia, efficient scheduling of shared resources.

2. Description of Related Technology

As wireless spectrum continues to grow increasingly more crowded, neighboring wireless systems are faced with the challenge of sharing scarce spectral resources with incompatible neighboring systems. For example, in the United States, wireless systems based on the Bluetooth protocol standard occupy the 2.4 GHz to 2.4835 GHz band. However, IEEE 802.11b-based and IEEE 802.11g-based wireless systems also occupy the 2.4 GHz to 2.4835 GHz band. Concurrent operation of Bluetooth and IEEE 802.11 devices in close proximity can adversely affect both systems.

Within this context, it is increasingly common for wireless devices such as smartphones, tablet computers and laptop computers to implement both Bluetooth and IEEE 802.11 wireless technologies within the same device. Evolving consumer preferences put significant pressure on device manufacturers to implement smaller and more aggressive form factors. In order to support both Bluetooth and IEEE 802.11-based systems on the same device, existing solutions implement a time sharing scheme to reduce interference while maintaining reasonable levels of performance.

As a brief aside, existing Bluetooth systems implement a master-slave structure to facilitate communication between devices. For example, the Asynchronous Connectionless Link (ACL) protocol for extant Bluetooth devices implements a so-called "polling" scheme; a master device polls the slave device to determine if the slave device has data available for transaction. The master device waits a prescribed period for a response from the slave device. The polling procedure repeats according to a schedule that is unique for each actively connected Bluetooth device. Typically, the polling schedule repeats over short time intervals which are imperceptible to human users. For example, the polling interval for a Bluetooth keyboard is fast enough to render keystrokes without a perceptible delay. Similarly, polling intervals for Bluetooth mice provide fine enough granularity to avoid tracking artifacts (e.g., a jumpy "pointer", perceptible lag).

However, existing Bluetooth-compliant devices operate at a relatively low data rate (Bluetooth Version 2.1 with Enhanced Data Rate (EDR) has a maximum rate of 3 Mbits/sec), especially when compared to IEEE 802.11-compliant devices (IEEE 802.11g can provide data rates up to 54 Mbits/sec). As previously alluded to, allocating more bandwidth (e.g., in the form of time and/or spectral resources) to Bluetooth devices reduces the bandwidth that is available to IEEE 802.11. This can significantly compromise the overall performance of IEEE 802.11 devices, especially in applications which require significant amounts of data.

Consequently, improved apparatus and methods are needed for efficient scheduling of shared resources wireless air interfaces on the same (or proximate) devices (e.g., scheduling of bandwidth resources between Bluetooth and IEEE 802.11 wireless systems on the same mobile device).

SUMMARY OF THE INVENTION

The present invention provides, inter alia, apparatus and methods for efficient scheduling of shared resources.

In one aspect of the present invention, a method for efficient scheduling of shared resources is disclosed. In one embodiment, the method includes: determining one or more priorities for relating to a plurality of interfaces; generating a schedule for one or more resources shared by the plurality of interfaces based on the determined one or more priorities; providing the schedule to each of the plurality of interfaces; and monitoring for changes which require adjustment to the generated schedule.

In a first variant, the plurality of interfaces includes at least a Bluetooth-compliant interface, and an IEEE 802.11-compliant interface.

In a second variant, the plurality of interfaces includes an interface to one or more human interaction devices such as e.g., a Bluetooth-compliant mouse, a Bluetooth-compliant keyboard, a Bluetooth-compliant headset, a Bluetooth-compliant microphone.

In a third such variant, at least some of the determined priorities are based on a level of device activity.

In a fourth variant, the determined priorities include at least an active priority and inactive priority for the relevant device.

In a second aspect of the present invention, an apparatus configured to efficiently schedule shared resources is disclosed. In one exemplary embodiment, the apparatus includes: a plurality of interfaces; a processor; and a non-transitory computer readable apparatus having a storage medium with at least one computer program stored thereon. In one variant, the at least one computer program is configured to, when executed on the processor: determine at least one priority for a plurality of interfaces; generate a schedule for one or more resources shared by the plurality of interfaces based on the determined at least one priority; provide the schedule to each of the plurality of interfaces; and monitor for changes which require adjustment to the generated schedule.

In one variant, at least one of the plurality of interfaces includes a master interface configured to control one or more slave devices. In one implementation, the master interface is configured to poll, either periodically or according to another scheme, the one or more slave devices. The polling may include at least an indication of activity of the corresponding one or more slave devices.

In another variant, the plurality of interfaces includes at least a first wireless technology and a second wireless technology. In one implementation, the first wireless technology and second wireless technology share a common operating frequency. In other variants, the first wireless technology divides access to the common operating frequency into a number of time slot increments. In one exemplary variant, the first wireless technology is a Bluetooth-compliant protocol.

In a third aspect, a non-transitory computer readable apparatus having a storage medium with at least one computer program stored thereon is disclosed. In one exemplary embodiment, the at least one computer program is configured to, when executed on the processor: determine a priority for a first device and a second device based on a previous human interaction; generate a schedule for one or more resources shared by the first device and second device; and access the first device and second device according to the generated schedule.

In one variant, the non-transitory computer readable apparatus includes a "density modulated" allocation scheme. For example, the density modulated allocation scheme includes allocating a number time slots over a number of cycles.

In a fourth aspect of the invention, a multi-interface optimized wireless mobile device is disclosed. In one embodiment, the device is a smartphone having a cellular (e.g., 3G, LTE, GSM) interface, WLAN (e.g., Wi-Fi) interface, and PAN (e.g., Bluetooth) interface.

In a fifth aspect of the invention, a method of managing wireless interface operation on a multi-interface device so as to optimize data throughput is disclosed. In one embodiment, the method includes selectively reallocating shared time frequency resources from one or more non-data wireless interfaces (e.g., Bluetooth interfaces) to a data interface of the device (e.g., WLAN interface) so as to optimize data throughput. The selective re-allocation is in one variant conducted based on speculation of the use or lack thereof of the non-data interfaces.

Other features and advantages of the present invention will immediately be recognized by persons of ordinary skill in the art with reference to the attached drawings and detailed description of exemplary embodiments as given below.

DETAILED DESCRIPTION OF THE INVENTION

Overview

The present invention discloses, inter alia, methods and apparatus for efficient scheduling of shared resources. Specifically, in one aspect, an intelligent scheduler prioritizes a set of shared resources to maximize device performance. In one exemplary embodiment, the scheduler identifies devices which are "active" and "inactive". Active devices are allocated a larger portion of resources, compared to inactive devices. Specifically, human interaction devices (e.g., mouse, keyboard, headset, microphone, etc.) are typically not used simultaneously; rather, they are used on an alternating basis (the user is either using the mouse or using the keyboard, the user seldom uses both). By predicting which human interaction device will be used, resources can be intelligently allocated to appropriate interfaces. The scheduler can reclaim resources that otherwise would be wasted on inactive devices; these resources can be allocated for other uses, claimed by other wireless interfaces, etc.

In one example implementation, the scheduler reduces polling of inactive Bluetooth devices, and reserves the remaining time slots for IEEE 802.11 activity. Consider a scheduler that is supporting two (2) Bluetooth devices (e.g., a keyboard and a mouse), and an IEEE 802.11 interface. The scheduler identifies which of the Bluetooth device is active and/or inactive, and allocates a larger proportion of time slots to the active device. The inactive device is allocated a polling resource (e.g., to determine when the inactive device should be transitioned to an active device). The remaining time slots can be claimed by the IEEE 802.11 interface for data use.

Detailed Description of Exemplary Embodiments

Exemplary embodiments of the present invention are now described in detail. While these embodiments are primarily discussed in the context of scheduling polling attempts for personal area networks (PAN) and wireless local area networks (WLAN) (e.g., Bluetooth devices that are sharing bandwidth with IEEE 802.11-based devices), it will be recognized by those of ordinary skill that the present invention is in no way so limited. In fact, principles of the present invention may readily be applied to other communication protocols and transports, whether wired or wireless. For example, various aspects of the present invention may be applied to scheduling schemes useful with any set of interfaces that have one or more shared resource conflicts. As another example, shared resource conflicts on wireline RF systems (e.g., CATV) may also benefit from various aspects of the invention.

Figure 1:
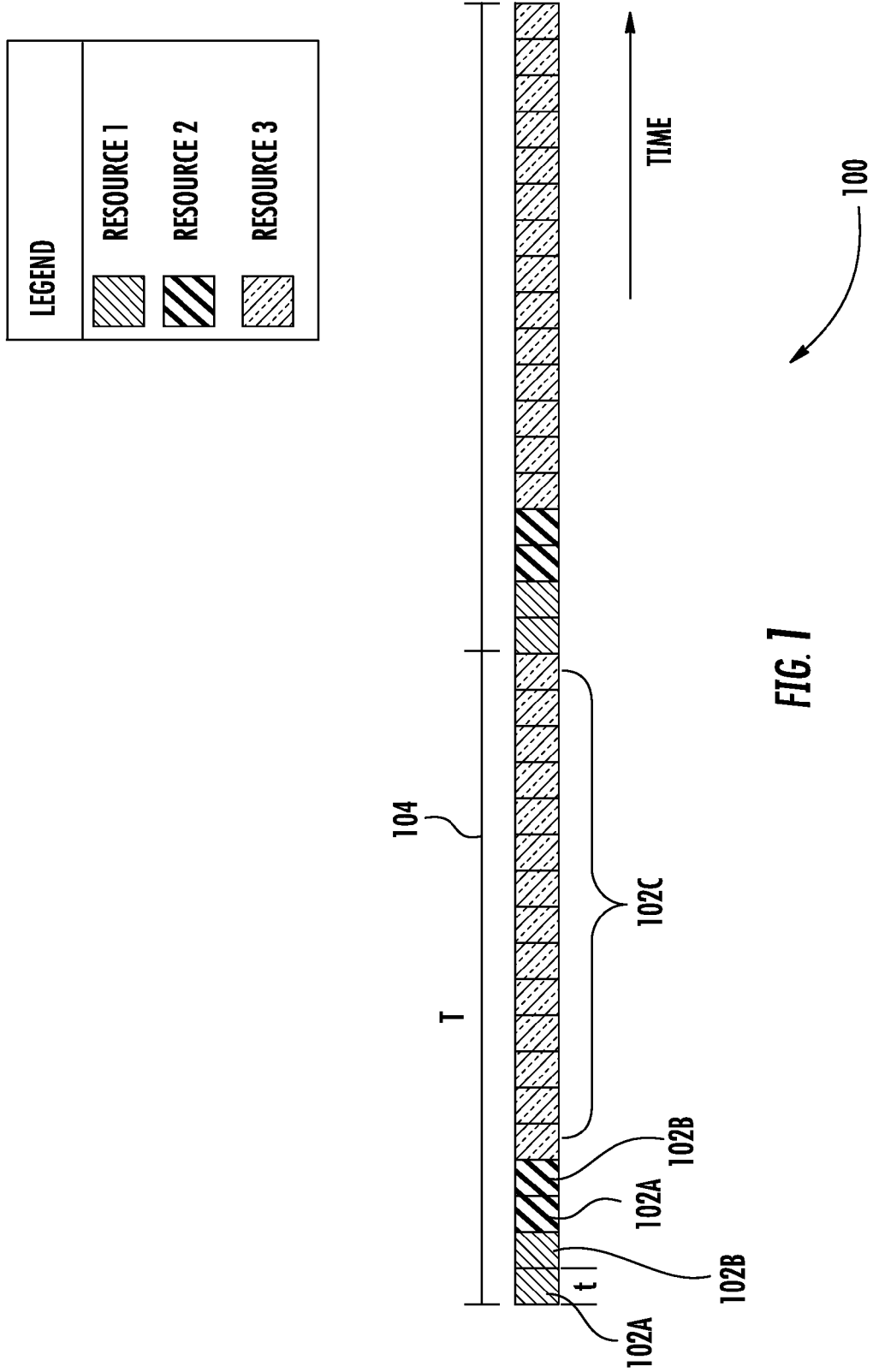
FIG. 1 is a graphical illustration of a prior art schedule for sharing time connection resources between two exemplary Bluetooth devices and an IEEE 802.11-based wireless connection.

FIG. 1 is a graphical illustration of a prior art time-multiplexed schedule 100 for a common frequency band between PAN and WLAN (e.g., Bluetooth devices and IEEE 802.11) devices. As used herein, the term "Bluetooth" refers without limitation to any device, software, interface or technique that complies with one or more of the Bluetooth technical standards, including Bluetooth Core Specification Version 1.2, Version 2.0, and Version 2.1 +Enhanced Data Rate (EDR), each of the foregoing incorporated herein by reference in its entirety.

Each time slot 102 shown in FIG. 1 is 625 µs in duration. The number of available time slots is dictated by the scheduling window T 104. As shown, the scheduling window is 11.25 ms in duration, with eighteen (18) available time slots ((11.25 ms windows)/(625 µs time slot)=18 time slots). For Bluetooth devices, a first time slot 102A is allocated for the master to transmit a polling message to the Bluetooth slave device, and the subsequent time slot 102B is reserved for the slave device to transmit a response. The process is repeated for the each slave device; i.e., the master will poll and wait for a response for each slave device, sequentially. The remaining time slots 102C can be used by the IEEE 802.11 system.

As shown, the prior art time-multiplexed schedule has assigned a first set of time slots (resource 1) to the first Bluetooth device (such as a mouse), a second set of time slots (resource 2) to the second Bluetooth device (such as a keyboard), and the remaining time slots (resource 3) to the IEEE 802.11 device. Over two scheduling windows, eight (8) time slots are allocated to two Bluetooth devices, while twenty-eight (28) time slots are allocated to the IEEE 802.11 device. During normal operation, the eight (8) Bluetooth slots are not fully utilized and are wasted (e.g., mouse and keyboard data has a very low data rate). Consequently, the IEEE 802.11 interface is effectively robbed of potentially usable bandwidth, which can result in inter cilia, slower data speeds and reduced user experience.

Method—

Figure 2:
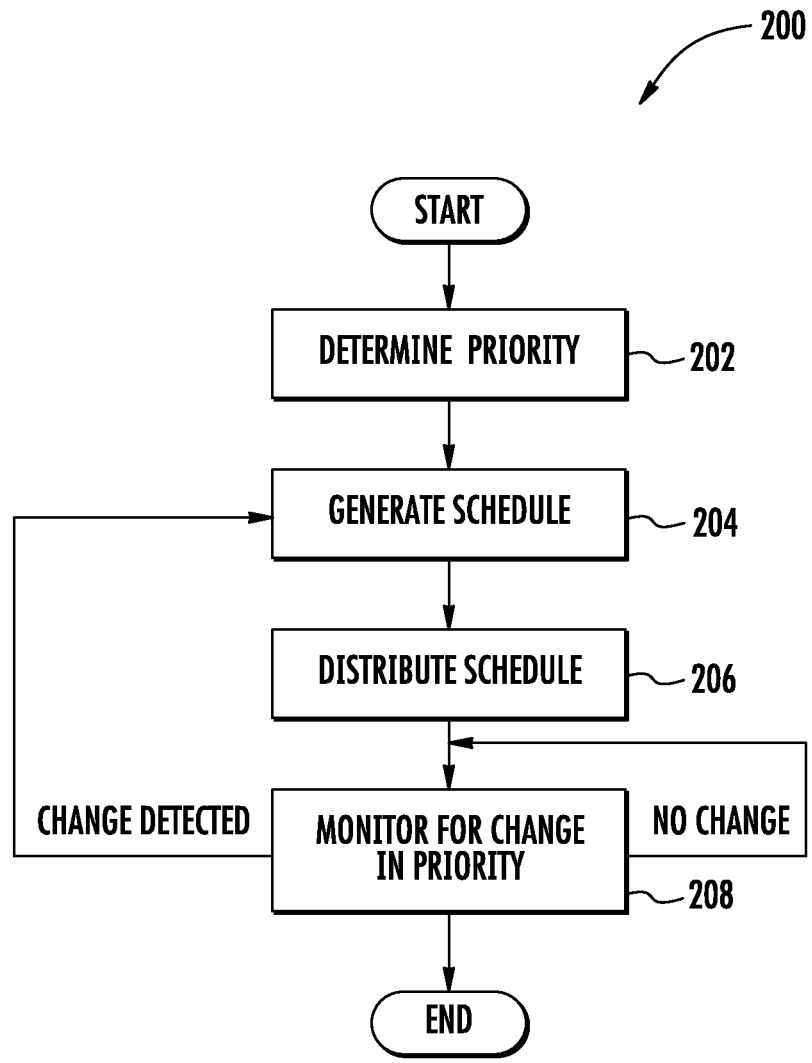
FIG. 2 is a logical flow diagram illustrating one embodiment of a generalized methodology for efficiently scheduling shared time resources according to the present invention.

Now referring to FIG. 2, a logical flow diagram of one embodiment of a generalized method for efficiently scheduling shared time resources is illustrated. In one implementation, the scheduler includes a software process or computer program executed on an applications processor. As used herein, the term "computer program" or "software process" is meant to include without limitation any sequence or human or machine cognizable steps which perform a function. Such program may be rendered in virtually any programming language or environment including, for example, C/C++, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like. Alternately, the scheduler can be embodied within hardware logic, or programmable circuitry.

The scheduler is coupled to at least a first and a second interface which share one or more resources. For instance, one exemplary mobile device includes an applications processor executing a scheduling process that controls a first Bluetooth-compliant wireless interface, and a second IEEE 802.11 interface sharing a common frequency range.

A resource is considered a "shared" resource when more than one interface requires the same resource in order to operate. Common examples of shared resources include, without limitation, time slots, frequency bands, time-frequency resources spreading codes, shared components (e.g., an amplifier, a multiplexer, a mixer, a switching element, etc.), etc.

Moreover, it is further appreciated that an interface may be further logically divided into multiple sub-interfaces. For example, a Bluetooth interface may be further subdivided into logical interfaces for each connected Bluetooth device. Similarly, an IEEE 802.11 interface may be logically subdivided into multiple sub-interfaces.

At step 202 of the method 200, the scheduler determines a priority for each of the interfaces. In one embodiment, an "active" or "inactive" priority is determined according to historical use. For example, a Bluetooth interface corresponding to a slaved Bluetooth device which previously had data for transfer can be considered "active", whereas a Bluetooth interface corresponding to a Bluetooth device which previously did not have data for transfer is "inactive". In alternate embodiments, enabled interfaces are "active", disabled interfaces are "inactive". In still other embodiments, interfaces which have data for transfer are active, whereas interfaces which do not have data for transfer are inactive.

It is further appreciated that "active" and "inactive" are merely illustrative of a broader range of applicable prioritization schemes. Artisans of ordinary skill in the related arts will readily recognize given the contents of the present disclosure that other forms of priority indication may be used having various granularities and features therewith. For example, various representations of priority may be e.g., weighted by importance, weighted by time last serviced, weighted by time requirements (e.g., maximum latency, minimum throughput, etc.). In one such embodiment, the scheduler may ascertain priority and order the importance of interfaces accordingly. For example, a scheduler may include various optimization engines, and/or rules engines to determine, based on priority, the optimal scheme for allocating resources to each of the interfaces.

Referring back to step 202, active or inactive status of each interface is determined based on e.g., polling one or more associated devices for a communication update. For instance, a Bluetooth master device will send a poll request to a Bluetooth slave device via a logical port interface. The slave device will only respond to the poll request if it has acquired new data since its previous polling cycle. If the slave device replies to the poll request with new data, the scheduler will identify the device (and its associated interface) as active. If the slave device has no new data to transmit, it is considered inactive.

In still other embodiments, the priority for each interface may be initially predetermined by the scheduler according to e.g., default settings or application specific preferences. In one implementation, one or more interfaces are organized in a preset hierarchy of importance with the most important interface being initially set as the highest priority interface. Importance can be derived or assigned from any number of criteria such as, inter alia, bandwidth requirements, type of device associated therewith, usage, importance to the user, historical frequency of use, etc.

For example, based on device-type, the scheduler may preferentially rank a Bluetooth mouse interface higher than a Bluetooth keyboard interface (or vice versa). In such scenarios, the bandwidth scheduler, based on the hierarchy, would initially set the mouse as the high priority active device and the keyboard device as a low priority inactive device. In another implementation, the bandwidth scheduler can randomly assign one of the devices as an initially active device while setting the remaining devices requiring the shared resource as inactive.

In one exemplary embodiment, the interfaces are further prioritized within subdivisions of technology. For example, in one exemplary implementation, the scheduler divides a first subset of time slot resources among all Bluetooth interfaces, and a second subset of time slot resources among all IEEE 802.11 interfaces. Specifically, by implementing the foregoing division of resources between Bluetooth interfaces and IEEE 802.11 interfaces, the scheduler ensures that resources are optimally shared to maximize performance. In particular, Bluetooth devices are typically used for human interaction devices (e.g., mouse, keyboard, headset, microphone, etc.). Humans generally interface with devices on a time scale which is quite long for electronic devices; moreover, simultaneous use of human interaction or interface devices (HIDs) is very limited. For example, a human using a mouse will not be using the keyboard. Thus, during normal operation, only a mouse or a keyboard will have active data, not both simultaneously. Consequently, the scheduler can allocate a relatively small subset of resources for Bluetooth interfaces, and allocate the remaining resources to the IEEE 802.11 interface.

It is further appreciated that other means of subdivision may be possible. For example, subdivision may be made on the basis of, inter alia, application type (e.g., a human interaction device drivers), data type (e.g., human interaction device data), associated device type (e.g., the device that is associated with the interface), etc.

More generally, the scheduler can allocate shared resources for each interface on the basis of how responsive the interface must be, how much data must be transacted, and/or how significant non-response is (e.g., some applications are more tolerant of lossy data than others).

At step 204 of the method 200, the scheduler generates a schedule for the shared resources based on the determined priorities. In one embodiment, the schedule is based on a predictive previous use algorithm. Specifically, the scheduler allocates more resources to interfaces which were previously used; for example, a Bluetooth mouse which was used in the immediately preceding polling cycle will be allocated a larger share of resources, whereas a Bluetooth keyboard which was not used will be allocated a smaller share of resources. Other common examples of scheduling based on previously determined priorities may be based on e.g., various weighting algorithms, fairness algorithms, etc.

Typical human interaction (e.g., use of a mouse, keyboard, headset, microphone, etc.) does not require significant data transactions. By predicting which human interaction device will be used, resources can be intelligently allocated to appropriate interfaces. Specifically, the bandwidth scheduler may analyze upcoming device workloads and schedule accordingly. For example, where an application expects specific input (e.g., based on a dialog box, a radio box opening event, etc.), the appropriate device (keyboard, or mouse) may be preferentially scheduled accordingly.

In other embodiments, the scheduler generates a schedule for the shared resources based on historical usage of one or more of the devices. For example, the bandwidth scheduler may schedule more of a shared resource to a device when that device is typically used more frequently, and schedule less of the shared resource when the device is typically not used or used less. In one variant, the historical usage is based on periods of time (e.g., early morning and late at night use might be minimal, or a user may only use there headset during the day and not at night). In other implementations, historical usage may be based on applications being used. For example, software applications may historically use certain resources more than others. Based on this history, the scheduler can prioritize interfaces to optimize for the most likely used device(s).

By predicting which interfaces (and/or associated devices) will or will not require resources, resources that otherwise would be wasted, can be reclaimed for use by other interfaces. Reclaiming wasted resources can be of particular benefit where the interfaces have disparate capabilities. For example, Bluetooth operates at a much lower data rate than IEEE 802.11; thus, the scheduler can intelligently provide more time slots for the IEEE 802.11 interface (which can significantly boost IEEE 802.11 performance). Unlike prior art solutions which allocated time slots to the Bluetooth device for a fixed polling schedule, various embodiments of the present invention can both reduce unnecessary polling, and provide the saved time slots to the IEEE 802.11 interface.

In one exemplary embodiment, the schedule of shared resources is a "density modulated" allocation scheme based on a running average. In a typical density modulated allocation scheme, resources are allocated as a fraction of units over a much larger cycle. For example, two (2) out of every three (3) time slot allocations would be a density of two thirds (⅔). Consider an active Bluetooth mouse and an inactive Bluetooth keyboard. The active Bluetooth mouse can be allocated a density of ⅔ of the available time slots, whereas the inactive Bluetooth keyboard can be allocated the remaining ⅓ of the available time slots.

Generally, density modulated allocation schemes are useful where the shared resource is divided into fixed time increments. In systems that are not based on fixed time increments, the scheduler may use for example a width modulated allocation scheme, where resources are allocated varying lengths of time intervals of use (instead of fixed increments). Still other examples of fractional allocation are commonly used within the related arts, and may be interchangeably used by one of ordinary skill, given the contents of the present disclosure.

At step 206, the scheduler provides the schedule to each of the interfaces. In one exemplary embodiment, the schedule identifies the appropriate resource for each interface. For example, in the exemplary case of a Bluetooth mouse and keyboard, and IEEE 802.11 interface, the scheduler identifies the appropriate time slots for mouse transactions, keyboard transactions, and IEEE 802.11 transactions.

At step 208, the scheduler monitors for changes in priority which require adjustment to the schedule. If an actionable change (e.g., one having scheduling implications, or which could reduce WLAN allocation) has been detected by the bandwidth scheduler, the bandwidth scheduler returns to step 204, and updates the schedule.

In one exemplary implementation, the scheduler monitors one or more interfaces (and/or associated devices) for usage changes. While the active Bluetooth device may be allocated the bulk of the Bluetooth time slots, the inactive Bluetooth devices are still allocated a time slot for indicating new activity. Thus, if a previously inactive device has new data, the scheduler will transition the inactive device to an active device. Similarly, if a previously active device does not fully utilize its time slot allocations, the scheduler will transition the active device to an inactive device. For example, if a user was previously using a Bluetooth mouse, and begins typing on the Bluetooth keyboard, the scheduler will transition the keyboard from inactive to active, and the mouse from active to inactive. Such transitions can occur very rapidly, and hence are effectively seamless to the user.

In alternate embodiments, the scheduler monitors for the changes in running applications. By monitoring changes in applications, the scheduler can reevaluate resource usage, and schedule shared resources accordingly. Each different application typically has a different "signature" or footprint of Bluetooth and/or WLAN usage or requirements, and hence use (or non-use) of that application can provide significant insight into resource demands. For instance, a word processing application may correlate to heavy HID use, since the user is likely typing or speaking in commands, selecting or editing text using the mouse, etc. Conversely, Internet browser use may be very heavy on WLAN resources and mouse use as the user surfs the Internet, watches videos, etc.

To this end, the scheduler can also be configured to evaluate or monitor usage or subprograms or subroutines within the applications. For example, in the case of the aforementioned word processing program, selection of an associated speech recognition capability within the program (e.g., speak to type) may signal impending use of a Bluetooth headset.

In one implementation of the method, the bandwidth scheduler monitors opening (or starting) and closing (or ending) of applications. In an alternate implementation, the scheduler monitors the usage of resources by the applications. If there is a sufficient change in usage of resources by an application, the bandwidth schedulers adjusts behavior accordingly. In still other variants, the scheduler monitors the devices for a change in usage against historical data. If device usage varies from historical usage by a sufficient amount, the scheduler adjusts behavior accordingly.

It will also be appreciated that while many of the embodiments described herein are cast in terms of individual priority determination for each interface (e.g., per step 202 above), a relative priority may be substituted if desired, thereby simplifying the logic in some cases. For instance, instead of determining that one interface is active and the other inactive, or high priority for one and low priority for the other, the scheduling logic may simply indicate that one interface is higher than the other (i.e., assign a single priority).

Example Operation—

Figure 3:
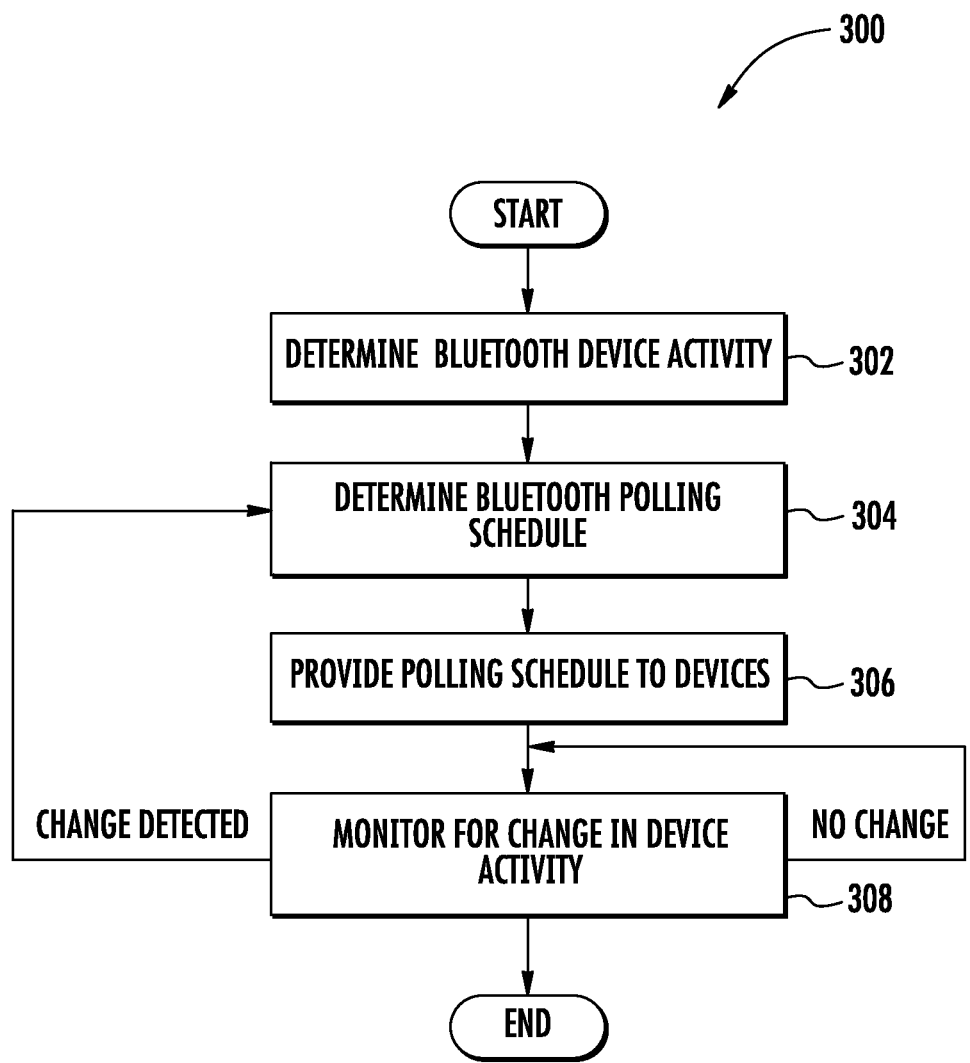
FIG. 3 is a logical flow diagram illustrating one exemplary methodology for efficiently scheduling shared time resources according to the present invention.

Referring now to FIG. 3, an example of a typical implementation of the generalized method of FIG. 2 is shown and described. The example of FIG. 3 is based on an architecture that time-shares a common frequency band between Bluetooth and IEEE 802.11-based communication. The frequency band is further divided into time slot increments. The shared bandwidth is scheduled according to time slots to support the Bluetooth system and IEEE 802.11-based system.

Consider the case where the scheduler must support a Bluetooth keyboard, a Bluetooth mouse, and a IEEE 802.11 device. In one exemplary implementation, the scheduler will minimize the amount of time slots that are allocated to an inactive Bluetooth device (which may be either the mouse or the keyboard, depending on the user's action), and maximize available time slots for the IEEE 802.11 system.

At step 302 of the method 300, the scheduler determines which of the Bluetooth devices are active or inactive. The scheduler polls the Bluetooth keyboard and mouse for activity; if either Bluetooth device has new data to transmit since the previous poll, the device will respond to the poll within the allocated time slot (indicating that the device is active). If the device does not have any new data since the last poll, the device will not respond to the poll (i.e., indicating that the device is inactive). For example, if a human user moves his hand from his mouse, to the keyboard and begins typing, then the Bluetooth keyboard will respond to the next poll with new data, while the Bluetooth mouse will not respond to the poll. The scheduler determines that the Bluetooth keyboard is active, whereas the Bluetooth mouse is inactive.

Figure 4:
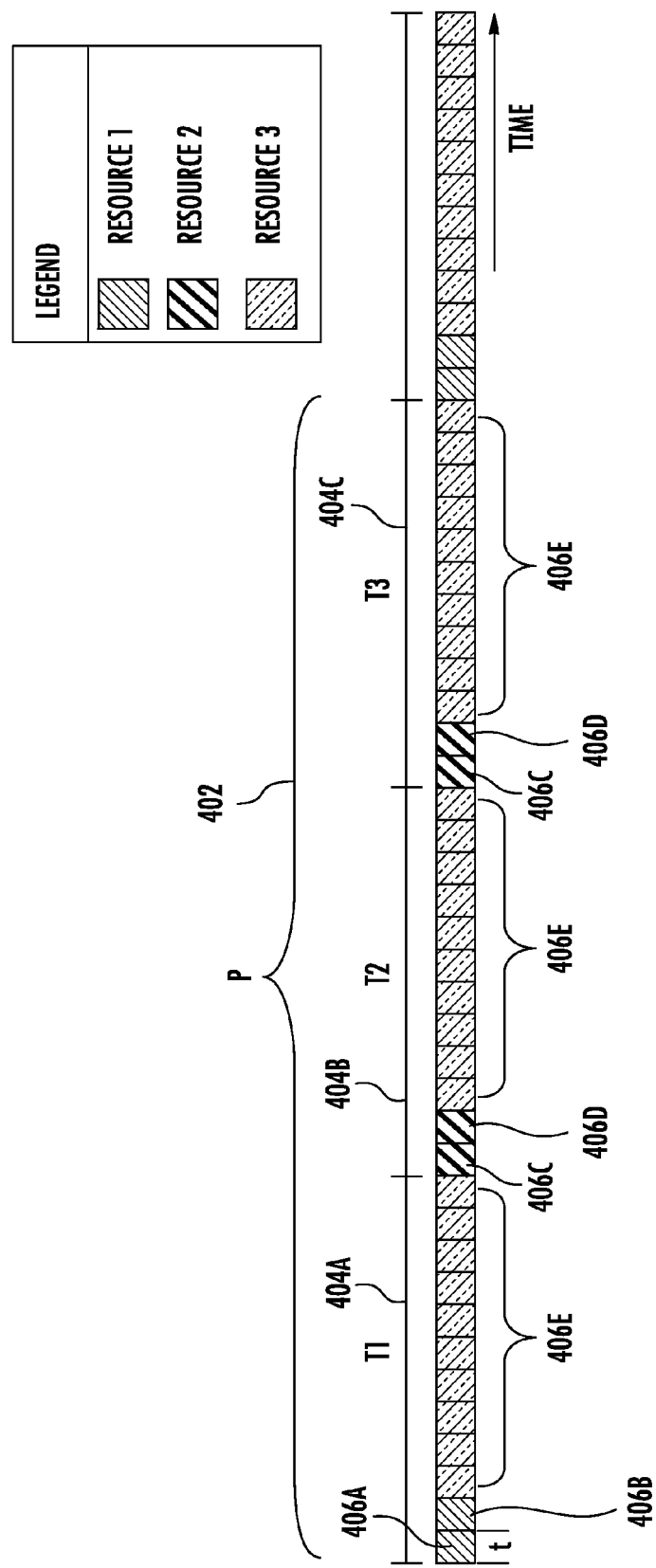
FIG. 4 is a graphical illustration of one exemplary schedule for sharing time connection resources between two exemplary Bluetooth devices and an IEEE 802.11-based wireless connection, in accordance with one embodiment of the present invention.

At step 304, the scheduler determines an appropriate schedule for polling of the Bluetooth devices, based on the active and inactive Bluetooth devices. As can be seen in FIG. 4, the bandwidth scheduler schedules the shared bandwidth between the Bluetooth keyboard, Bluetooth mouse, and the IEEE 802.11-based interface. As shown, the schedule has an overall time period P 402 of 22.5 ms. The time period P is further sub-divided into three sub-periods T1 404A, T2 404B, and T3 404C. Each time period consists of a 7.5 mS (millisecond) duration. Each period is divided into twelve time slots 406, each time slot having a 625 µS (microsecond) duration.

The scheduler reduces polling of inactive Bluetooth devices, and reserves the remaining time slots for IEEE 802.11 activity. In this example, the inactive Bluetooth mouse is allocated the first two time slots (406A, 406B) of a single sub-period (Ti) for polling/response, whereas the Bluetooth keyboard is allocated the first two time slots (406C, 406D) of each of the remaining two sub-periods (T2 404B, T3 404C) for polling/response. All remaining time slots 406E are scheduled for use by the IEEE 802.11-based system.

In this case, the scheduler has allocated six (6) time slots to the Bluetooth devices over time period P with the remaining thirty (30) time slots being allocated to the IEEE 802.11-based system. In comparison to the prior art scheduler of FIG. 1, eight (8) slots would been allocated to the Bluetooth devices with twenty-four (24) time slots being allocated to the IEEE 802.11-based system over the same 22.5 mS time period. Thus, many more time slots can be allocated to the IEEE 802.11-based system, significantly improving IEEE 802.11 performance without perceptible impact on the user experience.

Returning again to FIG. 3, at step 306, the scheduler distributes the schedule to the Bluetooth interfaces (i.e., the host Bluetooth mouse port, the host Bluetooth keyboard port, and the IEEE 802.11 network ports). Accordingly, each of the interfaces operates according to the determined schedule.

If a device changes in activity level (step 308), then the scheduler will reassess activity, and determine an updated schedule (return to step 304).

For example, the scheduler continues to monitor if the polled inactive Bluetooth device (in this case, the mouse) returns to an active state. Specifically, if the inactive Bluetooth mouse replies with data during the time slot allotted for reply, then the scheduler will reassess the Bluetooth mouse activity. Otherwise, the schedule is repeated; i.e., the keyboard remains the active device and the mouse remains an inactive device.

Physically Separate Variants—

It will also be appreciated that the methods and apparatus of the present invention may be applied to devices which are physically separate yet in proximity to one another, so as to interfere or cause less-than-optimal operation. For example, a computer with various Bluetooth HIDs (and no WLAN, or at least the WLAN is not operating) may be used in proximity to another physically separate device having a WLAN interface (with no Bluetooth, or at least the Bluetooth interface is not operating) which operates at the same time.

In one variant, the two devices can communicate, and hence a "distributed" scheduler approach is employed, wherein the two separate devices have scheduler programs or processes which communicate with one another (such as via an interposed connection medium or wireless interface, which may include the interfaces being managed by the scheduler) so as to coordinate scheduling to optimize resource allocation as described above.

Apparatus—

Figure 5:
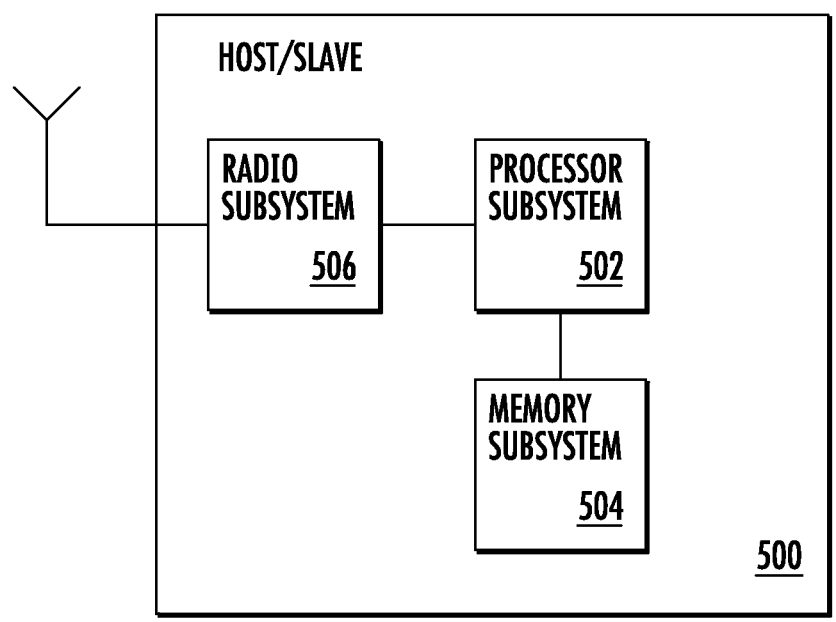
FIG. 5 is a block diagram of an exemplary host/slave device in accordance with one embodiment of the present invention.

Exemplary apparatus useful for implementing the methods of the present invention is illustrated in FIG. 5.

In the illustrated embodiment, the apparatus includes a processor subsystem 502 such as a digital processor, microprocessor, field-programmable gate array, and/or plurality of processing components mounted on one or more substrates. As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

The processing subsystem is connected to a memory subsystem 504 including memory which may, for example, include SRAM, flash and SDRAM components. As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM. The memory subsystem may implement one or a more of DMA type hardware, so as to facilitate data accesses as is well known in the art. The processor is configured to, inter alia, execute computer-readable instructions that are stored within the memory subsystem.

The foregoing components are in the exemplary implementation integrated circuits (ICs). As used herein, the term "integrated circuit (IC)" refers to any type of device having any level of integration (including without limitation ULSI, VLSI, and LSI) and irrespective of process or base materials (including, without limitation Si, SiGe, CMOS and GaAs).

In one exemplary embodiment, the memory subsystem on the host device includes computer-readable instructions which when executed by the processing subsystem perform master functionality, compliant with a master-slave protocol. Similarly, in one alternate embodiment, the memory subsystem on the slave device includes computer-readable instructions which when executed by the processing subsystem perform slave-related functionality, compliant with a master-slave protocol. In one common variant, the master-slave protocol is a Bluetooth-compliant master-slave protocol e.g., Asynchronous Connectionless Link (ACL) operation.

The memory subsystem also includes computer-readable instructions which when executed by the processing subsystem perform the exemplary scheduler operations to facilitate the efficient scheduling of shared resources. Alternately, a device may additionally contain software components which interact with a scheduler useful in implementing the present invention.

The radio/modem subsystem 506 generally includes a digital baseband, analog baseband, TX frontend and RX frontend. The apparatus further includes an antenna assembly that includes a plurality of switches for enabling various antenna operational modes, such as for specific frequency ranges, or specified time slots. In certain embodiments, some components may be obviated or may otherwise be merged with one another as would be appreciated by one of ordinary skill in the art given the present disclosure. In one exemplary embodiment, the radio/modem subsystem includes multiple air interfaces such as Bluetooth and Wi-Fi transceivers.

Other examples of common wireless standards include without limitation: WiMAX (IEEE Std. 802.16e), Long Term Evolution (LTE), and LTE-Advanced (LTE-A) cellular network standards. Still other common examples of cellular network standards include, but are not limited to: Global System for Mobile Communications (GSM), General Packet Radio Service (GPRS), Enhanced Data Rates for GSM Evolution (EDGE), Universal Mobile Telecommunications System (UMTS), High Speed Packet Access (HSPA), Interim Standard 95 (IS-95), Code Division Multiple Access 1Xtreme (CDMA-1X), CDMA-2000, etc. To the degree that the exemplary apparatus (e.g., mobile device, laptop computer, tablet computer, PC, etc.) contains multiple air interfaces of any of the foregoing types which overlap in resource, such as in the frequency domain, the methods and apparatus described herein may be employed as required to effectuate better resource allocation.

In one exemplary embodiment, the radio/modem subsystem is further configured to interface to one or more human interaction devices. For example, in one exemplary embodiment, the radio modem subsystem includes a Bluetooth wireless interface configured to interact with e.g., a Bluetooth mouse, Bluetooth keyboard, Bluetooth headset, Bluetooth microphone, and/or Bluetooth speakers, etc.

In certain embodiments of the apparatus, a user interface system may be provided. A user interface may include any number of well-known I/O including, without limitation: a keypad, mouse, optoelectronic sensor, touch screen or "multi-touch" screen, LCD display, backlight, speaker, and microphone. For example, it is recognized that a laptop may already include a keypad, touch sensor, etc., and additionally support Bluetooth peripherals.

The apparatus of FIG. 5 may further include optional additional peripherals including, without limitation, one or more GPS transceivers, or network interfaces such as IrDA ports, transceivers, USB (e.g., USB 2.0, USB 3.0, Wireless USB, etc.), FireWire, etc. It is however recognized that these components are not necessary for operation of the apparatus in accordance with the principles of the present invention.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method for managing scheduling resources amongst a plurality of interfaces, the method comprising:
   determining at least one priority for each of the plurality of interfaces, wherein each of the plurality of interfaces is associated with one or more wireless devices;
   generating a schedule of the scheduling resources for the plurality of interfaces based at least in part on the determined at least one priority for each of the plurality of interfaces;
   providing the schedule of the scheduling resources to each of the plurality of interfaces for communicating with the one or more wireless devices; and
   monitoring for scheduling changes that require adjustment to the schedule of scheduling resources.

2. The method of claim 1, wherein the plurality of interfaces comprises at least a Bluetooth-compliant interface and an IEEE 802.11-compliant interface.

3. The method of claim 1, wherein:
   the one or more wireless devices is associated with one or more human interaction devices; and
   each of the plurality of interfaces comprises an interface to the one or more human interaction devices.

4. The method of claim 3, wherein the one or more human interaction devices comprises a Bluetooth-compliant mouse.

5. The method of claim 3, wherein the one or more human interaction devices comprises a Bluetooth-compliant keyboard.

6. The method of claim 3, wherein the one or more human interaction devices comprises a Bluetooth-compliant headset with microphone.

7. The method of claim 1, wherein the determined at least one priority for each of the plurality of interfaces is based on a level of device activity associated with the one or more wireless devices.

8. The method of claim 1, wherein the determined at least one priority comprises at least an active priority and an inactive priority.

9. The method of claim 1, wherein the method further comprises adjusting the schedule of scheduling resources based at least in part on an activity of at least one wireless device of the one or more wireless devices associated with at least one of the plurality of interfaces.

10. The method of claim 9, wherein the activity of the at least one wireless device is associated with a level of human interaction with the one or more wireless devices.

11. An apparatus configured to efficiently manage scheduling resources amongst a plurality of interfaces, the apparatus comprising:
   a plurality of interfaces;

one or more processors; and a non-transitory computer-readable medium storing executable instructions that, when executed by the one or more processors, causes the apparatus to:

determine at least one priority for each of the plurality of interfaces, wherein each of the plurality of interfaces is associated with one or more wireless devices;

generate a schedule of the scheduling resources for the plurality of interfaces based at least in part on the determined at least one priority for each of the plurality of interfaces;

provide the schedule of scheduling resources to each of the plurality of interfaces for communicating with the one or more wireless devices; and monitor for scheduling changes that require adjustment to the schedule of scheduling resources.

12. The apparatus of claim 11, wherein at least one interface of the plurality of interfaces comprises a master device interface configured to communicate with one or more slave interfaces.

13. The apparatus of claim 12, wherein the master device interface is configured to periodically poll the one or more slave device interfaces.

14. The apparatus of claim 13, wherein the periodic polling comprises determining at least an indication of activity for one or more slave devices associated with the one or more slave device interfaces.

15. The apparatus of claim 11, wherein:

the plurality of interfaces comprises at least a first wireless communication technology and a second wireless communication technology; and the first wireless communication technology and second wireless communication technology share a common operating frequency.

16. The apparatus of claim 15, wherein the first wireless communication technology divides access to the common operating frequency into a number of time slot increments.

17. The apparatus of claim 15, wherein the first wireless communication technology comprises a Bluetooth-compliant protocol.

18. A non-transitory computer-readable medium storing executable instructions that, when executed by one or more processors, causes an apparatus to:

determine a priority for a first device and a priority for a second device based at least in part on a previous level of human interaction;

generate a schedule of scheduling resources shared by the first device and the second device based at least in part on the determined priority for the first device and the determined priority for the second device; and communicate with the first device and the second device according to the schedule of scheduling resources.

19. The non-transitory computer-readable medium of claim 18, wherein the schedule of scheduling resources comprises a density modulated allocation scheme based on a running average.

20. The non-transitory computer-readable medium of claim 19, wherein the density modulated allocation scheme allocates a number time slots over a number of scheduling cycles.

* * * * *